UNITED STATES PATENT OFFICE.

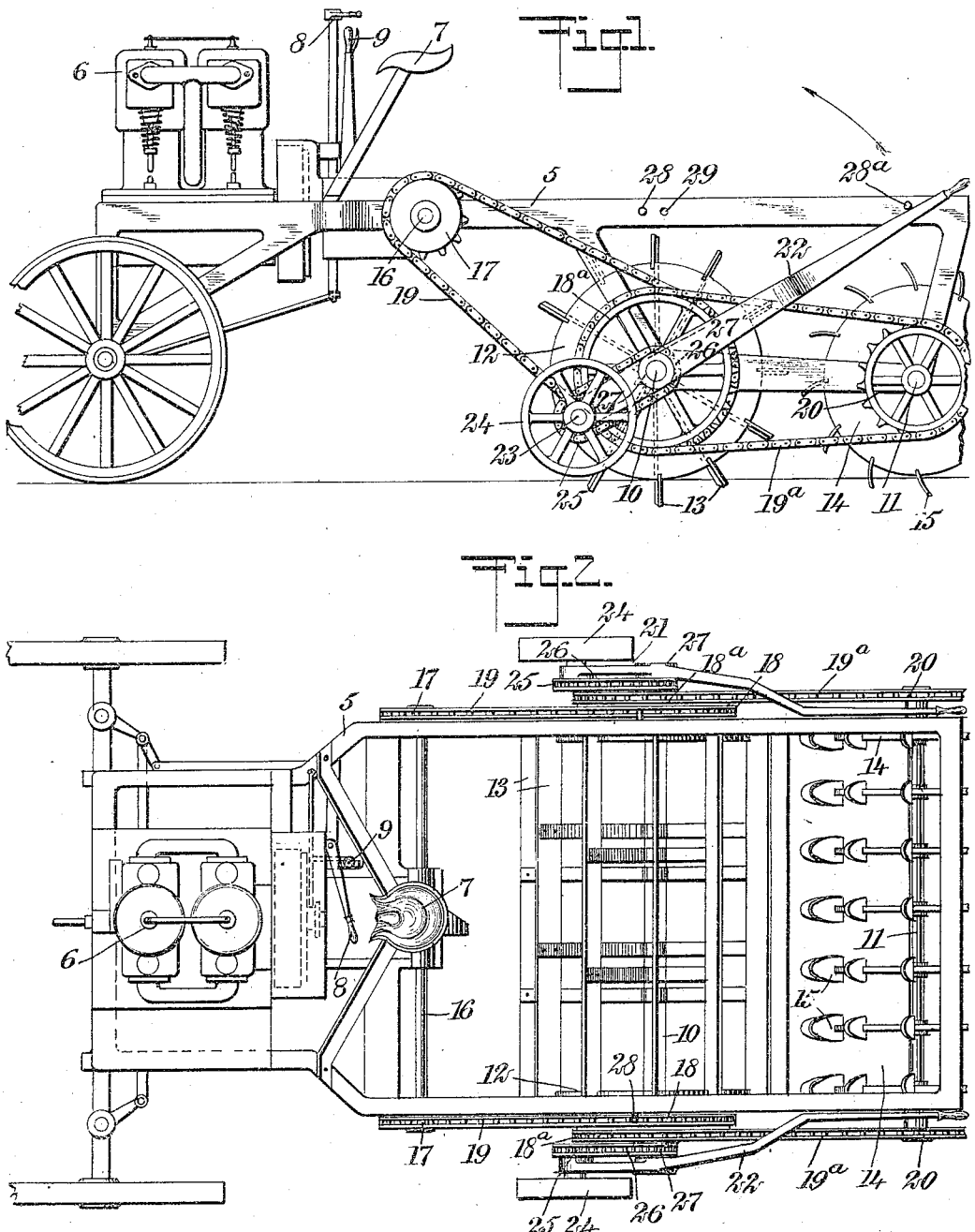

JOHN GARRETT REDMOND, OF FAIRMOUNT, ILLINOIS.

PLOW.

949,686.  Specification of Letters Patent.  Patented Feb. 15, 1910.

Application filed October 23, 1908. Serial No. 459,124.

*To all whom it may concern:*

Be it known that I, JOHN GARRETT REDMOND, a citizen of the United States, and a resident of Fairmount, in the county of Vermilion and State of Illinois, have invented a new and Improved Plow, of which the following is a full, clear, and exact description.

This invention has reference to improvements in rotary plows or cultivators, more especially such machines which are motor propelled, and its object is to provide means for lifting the plow cylinder from the ground, as when taking the machine to and from the field, this means being preferably constituted by crank-arms attached at opposite ends of the plow axle, each having a wheel journaled in its outer end, with one of the crank-arms provided with an operating lever, and means for positively driving the wheels from the plow.

Reference is to be had to the accompanying drawings forming a part of this specification, in which similar characters of reference indicate corresponding parts in both views.

Figure 1 is a side elevation of a cultivator embodying my invention, showing the plow in operative position; and Fig. 2 is a plan of the cultivator.

The invention in its specific nature is made up of a frame 5, which is preferably constructed of metal and carries at its forward end, which is shown to be of reduced width, a motor 6 in the nature of an internal combustion engine. This end of the machine is wheel-supported and is provided with the usual operator's seat 7, the steering lever 8 and the mechanism incident thereto, and the controlling lever 9 for operating the motor clutch, which clutch is best shown in dotted outline in Fig. 2. Both the front and rear portions of the frame have depending side portions, which, in the case of the front carry the axle to which the wheels are applied, and at the rear serve as bearings for axles 10 and 11 respectively, with the axle 10 arranged forward of the axle 11 and revolubly supporting a plow cylinder 12, which is shown to be provided with a number of radially-arranged digging blades 13. To the axle 11 is attached a cylinder 14 which is also provided with a number of blades 15, which blades, however, instead of extending across the cylinder as in the case of the blades 13, are arranged in transverse planes at intervals of the cylinder's length and are spaced apart and grooved curved slightly forward to effectually pass under the ground cut by the plow and chop the same up into small pieces.

The driving shaft of the motor is geared to a cross shaft 16 journaled in the frame forward of the plow, which shaft is provided with sprocket wheels 17, which are connected with sprocket wheels 18 by chains 19, the sprocket wheels 18 being revoluble on the extended ends of the axle 10 and having their hubs rigid with the plow cylinder. Similar sprocket wheels 18$^a$ are also journaled on the axle 10 and are rigid with the sprocket wheels 18, and operate to drive through chains 19$^a$, sprocket wheels 20 attached to the ends of the axle 11. To the extended ends of the axle 10, are keyed crank arms 21 which are provided with controlling levers 22. Both of said arms carry running and supporting wheels 24, journaled on stub-shafts 23, said shafts carrying sprocket wheels 25 which are connected by chains 26 with sprocket wheels 27 that are rigid with the sprocket wheels 18$^a$, and, consequently, with the plow cylinder. By operating either lever 22, the wheels 24 may be held on the ground, or off the same when in operation, as shown in Fig. 1. When, however, it is desired to elevate the plow above the ground, as when taking it to and from the field, the lever is moved in the direction indicated by the arrow in Fig. 1, against a stop 28 projecting from the frame, a pin 28$^a$ which is employed in holding the lever in a depressed position being removed and inserted in an opening 29, thus locking the lever against movement in either direction. It is obvious that other means for locking either lever 22, may be employed.

The operator seated on the seat 7 has control over the steering and driving of the machine, and when the land to be plowed is reached, the lever 22 is moved to the position shown in Fig. 1, carrying the wheels 24 above the ground and leaving the entire weight at the rear portion of the machine to rest on the plow, causing the blades thereof to sink into the soil. On now driving the machine, the blades of the plow will dig up the ground, which will afterward be broken into small pieces by the blades 15, the latter having an angular velocity about twice as great as that of the blades 13, by reason of the relative sizes of the sprocket wheels 18$^a$ and 20. When the machine is moved from the field, the wheels 24 are depressed by bringing the lever 22 to an upright position, and the propulsion of the cultivator takes place by the positive driving of these wheels through the chain and sprocket connections instead of through the actuation of the plow.

Having thus described my invention, I claim as new and desire to secure by Letters Patent:

1. The combination with a frame and a motor thereon, of a rotary plow, the axle of said plow having crank arms and a lever connected therewith, transporting wheels journaled on said arms, and gearing connecting the motor and plow, and other gearing connecting the plow and wheels, whereby the latter are driven positively and may be adjusted into or out of contact with the soil, substantially as shown and described.

2. The combination with a motor and a frame having front supporting wheels, a rotary plow, gearing operatively connecting the motor and plow, and transporting wheels 24 geared with the plow and constantly driven therefrom, levers upon which the wheels are journaled, said levers being pivoted on the axis of the plow for adjusting the wheel axes concentrically therewith, to carry the wheels into or out of contact with the soil, so that when in one postition the wheels act as drivers for the vehicle while the plow is elevated, and, in the other position, the plow acts as the driver, substantially as shown and described.

3. The combination, in a motor-driven vehicle, of a frame having front supporting wheels, a rotary plow cylinder 12, journaled in the rear portion of the frame and having radial cutting blades extending its entire length, a rear rotary cylinder 14, having chopping blades 13 arranged in parallel rows lengthwise of the cylinder and spaced apart in the several rows, sprocket gearing connecting the two cylinders, a motor-driven shaft and sprocket gearing connecting it with the front plow cylinder, crank arms journaled on the axle of the front cylinder and carrying at its ends small running and supporting wheels 24, hand levers rigidly connected with the crank arms and adapted for controlling the position of said running wheels, and sprocket gearing connecting such wheels with the front plow cylinder as shown and described.

In testimony whereof I have signed my name to this specification in the presence of two subscribing witnesses.

JOHN GARRETT REDMOND.

Witnesses:
LEWIS A. ABDILL,
JAMES T. BAILEY.